(12) United States Patent
Bakshi et al.

(10) Patent No.: US 12,335,303 B2
(45) Date of Patent: Jun. 17, 2025

(54) SYSTEM AND METHOD FOR DETECTING AND COUNTERING MALICIOUS CODE

(71) Applicant: Bank of America Corporation, Charlotte, NC (US)

(72) Inventors: Sakshi Bakshi, New Delhi (IN); Sudhakar Balu, Chennai (IN); Siva Paini, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 290 days.

(21) Appl. No.: 18/149,193

(22) Filed: Jan. 3, 2023

(65) Prior Publication Data

US 2024/0223595 A1 Jul. 4, 2024

(51) Int. Cl.
H04L 9/40 (2022.01)

(52) U.S. Cl.
CPC ...... H04L 63/1441 (2013.01); H04L 63/0236 (2013.01); H04L 63/1416 (2013.01); H04L 63/1425 (2013.01)

(58) Field of Classification Search
CPC ............. H04L 63/1441; H04L 63/0236; H04L 63/1416; H04L 63/1425
See application file for complete search history.

(56) References Cited

U.S. PATENT DOCUMENTS

| | | | |
|---|---|---|---|
| 7,979,368 B2 | 7/2011 | Kapoor et al. | |
| 8,135,657 B2 | 3/2012 | Kapoor et al. | |
| 8,402,540 B2 | 3/2013 | Kapoor et al. | |
| 8,738,765 B2 | 5/2014 | Wyatt et al. | |
| 9,009,822 B1 | 4/2015 | Ismael et al. | |
| 9,009,823 B1 | 4/2015 | Ismael et al. | |
| 9,356,955 B2* | 5/2016 | Belva | H04L 63/1466 |
| 9,367,681 B1 | 6/2016 | Ismael et al. | |
| 9,525,696 B2 | 12/2016 | Kapoor et al. | |
| 9,594,905 B1 | 3/2017 | Ismael et al. | |
| 9,792,196 B1 | 10/2017 | Ismael et al. | |
| 9,800,608 B2 | 10/2017 | Korsunsky et al. | |
| 9,824,209 B1* | 11/2017 | Ismael | G06F 21/54 |

(Continued)

OTHER PUBLICATIONS

Bakshi, Sakshi, "System and method for protecting non-public information from malicious users," U.S. Appl. No. 18/149,204, filed Jan. 3, 2023 (59 pages).

*Primary Examiner* — Noura Zoubair
*Assistant Examiner* — Afaq Ali

(57) ABSTRACT

A system for detecting and countering malicious code executed on a web application detects a set of configuration parameter values from the web application. The system compares each configuration parameter value with a counterpart from among a set of historical configuration parameter values. The system determines the difference between a configuration parameter with a counterpart historical configuration parameter values. If the system determines that the difference between the configuration parameter and the counterpart historical configuration parameter is more than a threshold rate, the system determines that a malicious code is executed on the web application. In response, the system determines a function associated with the malicious code. The system determines one or more actions to counter the malicious code based on the function of the malicious code. The system executes at least one of the one or more actions.

20 Claims, 6 Drawing Sheets

(56) References Cited

U.S. PATENT DOCUMENTS

| | | | |
|---|---|---|---|
| 10,264,104 B2* | 4/2019 | Katmor | H04L 63/1416 |
| 10,395,032 B2 | 8/2019 | Keller et al. | |
| 2008/0229415 A1 | 9/2008 | Kapoor et al. | |
| 2010/0251371 A1* | 9/2010 | Brown | G06F 21/554 |
| | | | 726/23 |
| 2011/0213869 A1 | 9/2011 | Korsunsky et al. | |
| 2011/0214157 A1 | 9/2011 | Korsunsky et al. | |
| 2011/0219035 A1 | 9/2011 | Korsunsky et al. | |
| 2011/0231564 A1 | 9/2011 | Korsunsky et al. | |
| 2014/0137119 A1 | 5/2014 | Hyde et al. | |
| 2015/0244734 A1* | 8/2015 | Olson | G06F 21/577 |
| | | | 726/25 |
| 2019/0207973 A1* | 7/2019 | Peng | G06F 21/577 |
| 2020/0358818 A1* | 11/2020 | Stoletny | G06F 21/566 |
| 2021/0014245 A1* | 1/2021 | Mckendall | G06F 21/54 |

* cited by examiner

SYSTEM AND METHOD FOR DETECTING
AND COUNTERING MALICIOUS CODE

TECHNICAL FIELD

The present disclosure relates generally to network security, and more specifically to a System and method for detecting and countering malicious code.

BACKGROUND

As the Internet continues to be utilized by an ever-increasing number of users, fraudulent and criminal activity via the Internet also rises. Web applications provided on websites are vulnerable to cyberattacks. A bad actor can launch a cyberattack to tamper with a web application or access non-public information that is available on the web application. It is challenging to secure web applications and non-public information from unauthorized access.

SUMMARY

The system described in the present disclosure is particularly integrated into practical applications of detecting malicious code and malicious users that are trying to tamper with a web/mobile/software application, executing appropriate countermeasure action(s) to address the detected malicious code or malicious user, and protecting non-public information that can be accessed from the application from unauthorized access. This, in turn, improves the performance and underlying operation of the application and reduces (or prevents) the network congestion that would otherwise be caused by the malicious code or malicious user.

These practical applications lead to the technical advantage of improving the security of applications and non-public information that can be accessed from the application. Therefore, the disclosed system minimizes (or prevents) unauthorized access to non-public information. This leads to securing non-public information from unauthorized access by bad actors.

Detecting and Addressing a Malicious Code

The disclosed system contemplates a system and method for detecting and addressing a malicious code that is launched to tamper with an application. In an example scenario, a malicious code may be launched remotely via a network. In one case, a robotic processing automation (RPA) code (e.g., an automated code script) may be executed on top of the application to minimize manual efforts by automating repetitive processes. For example, as part of a workflow for executing a particular task, the RPA code may be programmed to access non-public information on the application to complete the particular task. The particular task may be creating profiles for multiple users or any other task that may require repetitive operations, for example. The malicious code may be launched with respect to the application to gain unauthorized access to the non-public information that is available on the application. The malicious code may cause configuration parameters to deviate from historical configuration parameters which leads to network traffic congestion, performance degradation, and/or unauthorized access to non-public information accessible from the application. The configuration parameters may include failed login attempts, excess webpage visits, and/or communicate excess inbound data packages, among others.

The disclosed system may extract the configuration parameters and determine whether any of the configuration parameters deviate from the counterpart historical configuration parameter. In other words, the disclosed system may determine whether any of the configuration parameters are anomalous. If the disclosed system determines that one or more configuration parameters are anomalous, the disclosed system may conclude that a malicious code is launched to tamper with the application and/or the RPA code. In response, the disclosed system may determine a function or intent of the malicious code, e.g., by analyzing the anomalous configuration parameters. For example, if it is determined that a number of failed login attempts is deviating from historical failed login attempts with more than a threshold rate, the disclosed system may determine that function of the malicious code is to gain unauthorized access to a user profile by launching a brute-force attack to enter an enormous number of combinations of user credentials in the application in a short period of time that is not possible for a human.

In another example, if it is determined that a volume of network traffic to the application is deviating from historical network traffic to the application by more than a threshold rate, the disclosed system may determine that function of the malicious code is to cause network traffic congestion at the application, or cause performance degradation, among others. In response to determining the function of the malicious code, the disclosed system may determine one or more countermeasure actions to address and counter the malicious code. For example, the disclosed system may block the network communications originating from an Internet Protocol (IP) address of the malicious code, reroute the network communications originating from the IP address of the malicious code, filter the network communications originating from the IP address of the malicious code, among others. The disclosed system may execute one or more of the determined countermeasure actions. In this manner, the disclosed system improves the security of the application and non-public information associated with the application.

The disclosed system also reduces (or prevents) the network congestion that would otherwise be caused by the malicious code. Therefore, the disclosed system improves the network resource utilization at the application and databases and computing systems that maintain the application.

The disclosed system also reduces the processing and memory resources that are used to maintain and perform the functions of the application. For example, by addressing and countering the malicious code, the operations of the application can resume to a normal state without the tampering from or influence of the malicious code. Thus, the application and computer systems that maintain the application do not have to allocate processing and memory resources to maintain the operations of the application that would otherwise be spent to maintain the operations of the application while being under influence of the malicious code. The disclosed system also improves the security of the application, data available at the application, and computer systems that maintain the operations of the application by protecting non-public information from unauthorized access. The disclosed system may perform similar operations to detect malicious users and protect non-public information from malicious users.

In one embodiment, a system for detecting and countering malicious code executed on a web application comprises a memory operably coupled to a processor. The memory is configured to store a set of historical configuration parameter values associated with a web application, wherein the set of historical configuration parameter values provides information about historical events that occurred on the web application. The processor is configured to detect a set of configuration parameter values associated with the web application, the set of configuration parameter values provides information about events occurring on the web application. The processor may perform the following operations for at least a first configuration parameter from among the set of configuration parameter values. The processor determines the first configuration parameter value over a particular period. The processor compares the first configuration parameter value with a counterpart configuration parameter value from among the set of historical configuration parameter values. The processor determines a difference between the first configuration parameter value and the counterpart configuration parameter value. The processor determines that the difference between the first configuration parameter value and the counterpart configuration parameter value exceeds a threshold rate. The processor determines that a malicious code is executed on the web application, in response to determining that the difference between the first configuration parameter value and the counterpart configuration parameter value exceeds the threshold rate. The processor determines a function associated with the malicious code, wherein the function associated with the malicious code is one or more of gaining unauthorized access to non-public information associated with the web application, causing performance degradation at the web application, or causing network traffic congestion at the web application. The processor determines, based at least in part upon the function associated with the malicious code, one or more actions to counter the malicious code. The processor executes at least one of the one or more actions.

Protecting Non-Public Information from Malicious Users

The disclosed system contemplates a system and method for protecting non-public information from malicious users. In an example scenario, the disclosed system may monitor the events that occur on the application. For example, the disclosed system may monitor and capture the input data entered into the application, e.g., by a user. The input data may include text, numbers, etc. The disclosed system may determine the context (e.g., the meaning) of the input data by feeding the input data to a context detection machine learning module, including a natural language processing machine learning module.

The disclosed system may determine whether the input data is among non-public information, for example, by comparing the input data with a set of keywords that are known to be associated with non-public information. If the disclosed system determines that the input data is among the non-public information or includes non-public information, the disclosed system masks the input data. For example, the disclosed system may blur the input data. In this way, the non-public information is kept secure from data leakage and exposure to unauthorized people.

The disclosed system may tag the masked input data to an authentication instruction that when executed, prompts a user to provide credentials. Thus, if the authorized user wants to access and view non-public information, the user can provide the credentials. The disclosed system may verify the received credentials. If the received credentials are valid, the disclosed system may unmask the masked input data. Otherwise, if the disclosed system determines that the received credentials are invalid, the disclosed system may determine that the user is a malicious user who is attempting to gain unauthorized access to the masked non-public information. In response, the disclosed system may block the user profile from which the application is being accessed until the issue is resolved by authorities. In this manner, the disclosed system protects non-public information from malicious users and unauthorized access even if a malicious user somehow could access the application. Therefore, even if a malicious user could somehow access the application, the malicious user cannot access or view the non-public information because the non-public information is masked.

In one embodiment, a system for protecting non-public information from a malicious user comprises a memory operably coupled to a processor. The memory is configured to store a keyword that is known to be associated with non-public information. The processor is configured to determine that a set of input data is entered on a web application, wherein the set of input data comprises at least one of text or a number. The processor may perform the following operations for each input data. The processor extracts a first feature from the first input data, wherein the first feature comprises an indication of a meaning of the first input data. The processor extract a second feature from the keyword, wherein the second feature comprises an indication of a meaning of the keyword. The processor compares the first feature to the second feature. The processor determines that the first feature corresponds to the second feature. The processor determines that the first input data corresponds to the non-public information in response to determining that the first feature corresponds to the second feature. The processor masks the first input data, wherein masking the first input data comprises preventing the first input data from being displayed. The processor tags an authentication instruction to the masked first input data, such that when the authentication instruction is executed, the authentication instruction prompts a user to provide credentials. The processor detects a request to unmask the masked first input data. The processor executes the authentication instruction in response to detecting the request.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to detect a malicious code or user attempting to tamper with an application and protect non-public information associated with the application from the malicious code or user. Embodiments of the present disclosure and its advantages may be understood by referring to FIGS. 1 through 6. FIGS. 1 through 6 are used to describe systems and methods for detecting a malicious code or user attempting to tamper with an application and protecting non-public information associated with the application from the malicious code or user.

System Overview

Figure 1:
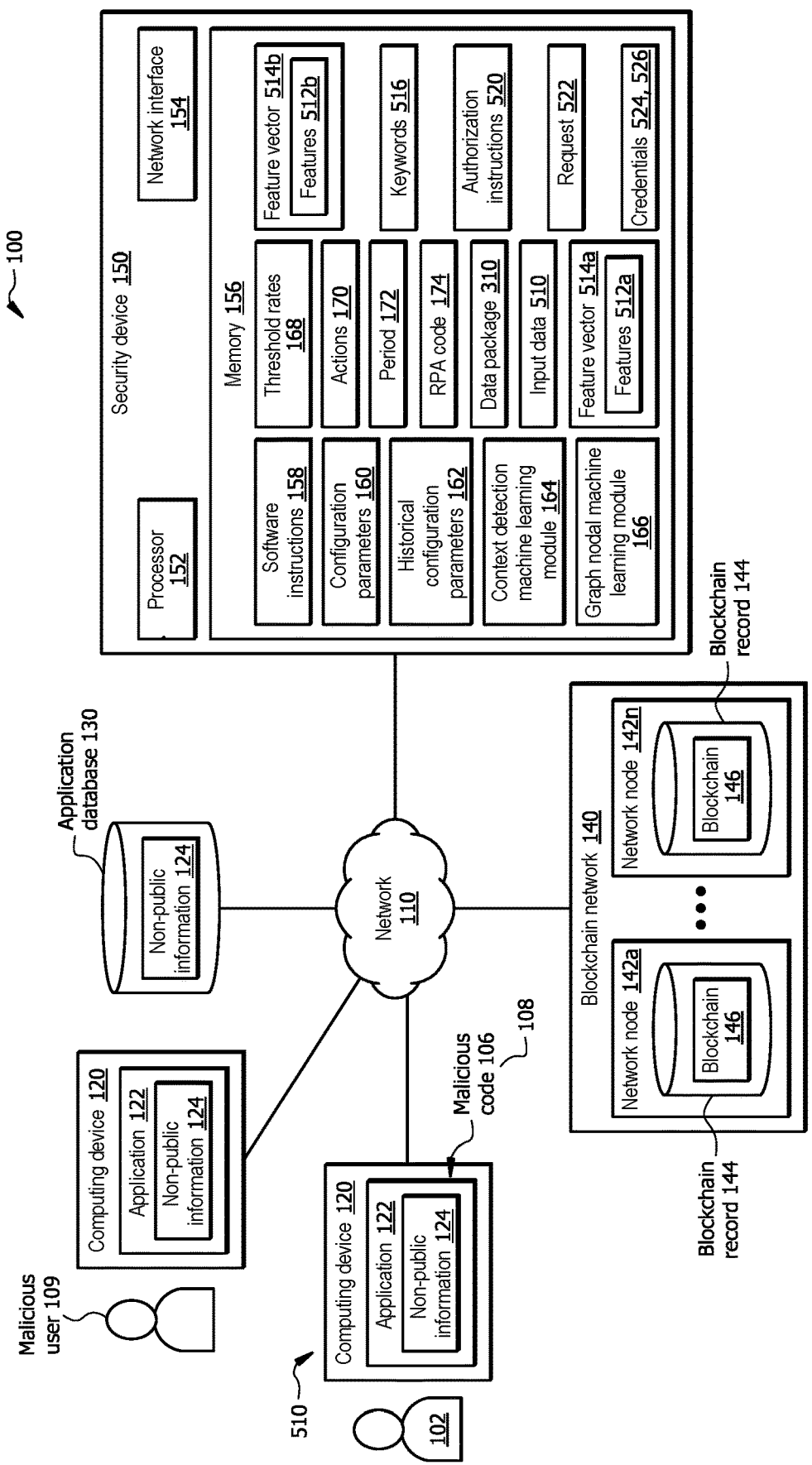
FIG. 1 illustrates an embodiment of a system configured to detect malicious code or user attempting to tamper with an application and protect non-public information associated with the application from the malicious code or user.

FIG. 1 illustrates an embodiment of a system 100 that is configured to detect a malicious code 106 (e.g., malicious bots) and malicious users 109 attempting to access non-public information 124 associated with an application 122 and its users, and in response to detecting the malicious code or user, implement appropriate countermeasure action(s) 170 to address the detected malicious code or user and protect the non-public information from unauthorized access.

In certain embodiments, the system 100 comprises a security device 150 communicatively coupled to one or more computing devices 120, an application database 130, and a blockchain network 140 via a network 110. Network 110 enables communication among the components of system 100. The security device 150 comprises a processor 152 in signal communication with a memory 156. Memory 156 stores software instructions 158 that when executed by the processor 152 cause the security device 150 to perform one or more operations described herein. For example, when the software instructions 158 are executed, the security device 150 performs operation(s) to detect a malicious code or user and if a malicious code or user is detected, execute appropriate countermeasure action(s) 170 to address the malicious code or user and to protect the non-public information 124 from unauthorized access. In other embodiments, system 100 may not have all of the components listed and/or may have other elements instead of, or in addition to, those listed above. The operation for detecting a malicious code 106 and determining action(s) 170 to counter the malicious code 106 is described in greater detail further below and in FIGS. 3 and 4. The operation for detecting a malicious user 109 and determining action(s) 170 to counter the tampering of the malicious user 109 with the application 122 is described in greater detail further below and in FIGS. 5 and 6.

In general, the system 100 is integrated into a practical application of detecting a malicious code and malicious user and implementing appropriate countermeasure action(s) 170 to address the detected malicious code or user and protect the non-public information from unauthorized access. In this manner, the system 100 protects non-public information from a malicious code, malicious users, and unauthorized access even if a malicious user or code could somehow access the application. Therefore, even if a malicious user or malicious code could somehow access the application, the malicious user or a malicious code cannot access or view the non-public information because the non-public information is masked or otherwise inaccessible to the malicious code or malicious user. This, in turn, improves the performance and underlying operation of the application 122 and reduces (or prevents) the network congestion that would otherwise be caused by the malicious code or user. Therefore, the system 100 improves the network resource utilization at the application 122 and databases 130 and computing systems (e.g., security device 150) that are tasked to maintain the application 122.

The system 100 also reduces the processing and memory resources that are used to maintain and perform the functions of the application 122. For example, by addressing and countering the malicious code (or user), the operations of the application 122 can resume to a normal state without the tampering and influence from the malicious code (or user). Thus, the application 122 and computer systems that maintain the application 122 do not have to allocate processing and memory resources to maintain the operations of application 122 that would otherwise be spent to maintain the operations of the application 122 while being under influence of the malicious code (or user). The system 100 also improves the security of the application 122, data available at the application 122, and computer systems that maintain the operations of the application 122 by protecting the non-public information from unauthorized access.

System Components

Network

Network 110 may be any suitable type of wireless and/or wired network. The network 110 may be connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMAX, etc.), a long-term evolution (LTE) network, a universal mobile telecommunications system (UMTS) network, a peer-to-peer (P2P) network, a Bluetooth network, a near-field communication (NFC) network, and/or any other suitable network. The network 110 may be configured to support any suitable type of communication protocol as would be appreciated by one of ordinary skill in the art.

Computing Device

A computing device 120 is generally any device that is configured to process data and interact with users. Examples of the computing device 120 include, but are not limited to, a personal computer, a desktop computer, a workstation, a server, a laptop, a tablet computer, a mobile phone (such as a smartphone), an Internet-of-Things (IoT) device, or any other suitable type of device. The computing device 120 may include a user interface, such as a display, a microphone, a camera, a keypad, or other appropriate terminal equipment usable by user. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices and components of the system 100 via the network 110.

The computing device 120 is configured to display the application 122 on a display screen to a user 102, 109. The user can access and interact with the application 122 on the display screen of the computing device 120. For example, the user may login to the application 122 using their credentials. The user may fill out data fields on the application 122, such as a name, an address, a phone number, etc., to open a new profile or initiate a new request on the application 122.

The application 122 may be a software/mobile/web application associated with an organization that provides services and/or products to its users. The users can access the services and/or products provided by the organization from the application 122. The application 122 may be associated with or include non-public information 124 and other types of information. The non-public information 124 may include sensitive, confidential, or private information (collectively referred to herein as non-public information) associated with users 102 and/or application 122 and/or the organization. For example, the non-public information 124 may include records of names, addresses, profile numbers, serial numbers, input text entered by a user 102 on the fillable data fields of the application 122, and other private information associated with users 102. In another example, the non-public information 124 may include proprietary data, such as a piece of software code, text, a report, a file, and the like, that include non-public or private data about operations of the application 122 and/or the organization and/or its users.

Application Database

Application database 126 is generally any storage architecture that is configured to store data and provide hardware and/or software resources (e.g., non-public information 124, source code of the application 122, instructions for the application 122, etc.) to other components of the system 100. Examples of the application database 126 include, but are not limited to, a database, a virtual machine, a network-attached storage cloud, a storage area network, and a storage assembly directly (or indirectly) coupled to one or more components of the system 100 via the network 110.

The application database 126 stores non-public information 124. For example, when the user 102 enters the non-public information 124 on the application 122, the application 122 communicates the non-public information 124 to the application database 126. The application database 126 may also store instructions or code associated with the application 122 and/or other types of information entered into the application 122. For example, the content, layout, and data fields of web pages and elements associated with application 122 and/or software functions associated with the application 122 used to maintain the operations of the application 122 may be stored in the application database 126.

The application 122 may send Application Programming Interface (API) requests to the application database 126, to, for example, perform a particular operation or access particular data stored at the application database 126. In response, the application database 126 may communicate the requested data to the application 122 in an API response.

Blockchain Network

Blockchain network 140 is a peer-to-peer network of network nodes 142a-n, and is generally configured to distribute non-public information 124 (and any other data/information) among the network nodes 142a-n In certain embodiments, blockchain network 140 is a public blockchain network. In certain embodiments, blockchain network 140 is a private blockchain network. For example, membership in blockchain network 140 may be limited to nodes 142 registered as belonging to and/or affiliated with the organization to which the security device 150 belongs. In certain embodiments, the security device 150 may be a member of blockchain network 140 (e.g., as a node 142 in blockchain network 140).

Figure 2:
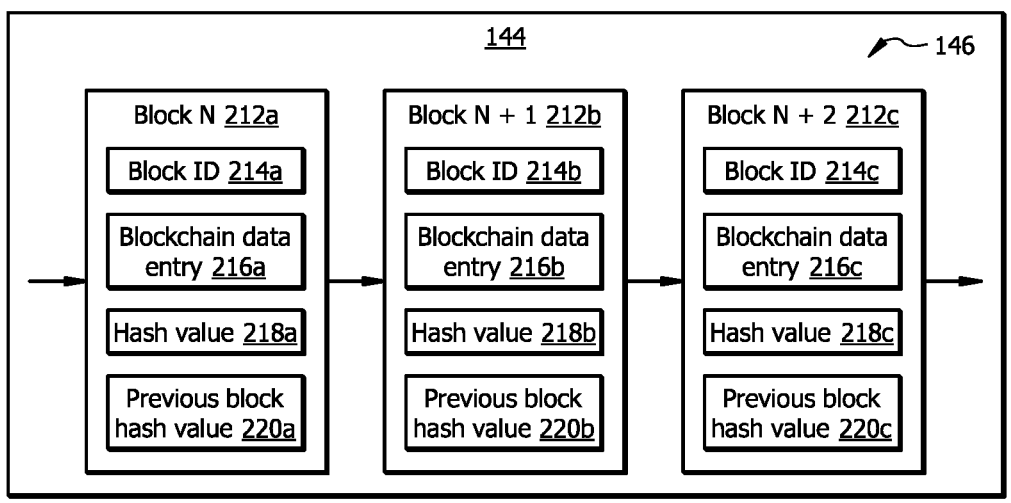
FIG. 2 illustrates an example embodiment of a blockchain network.

The blockchain network 140 may comprise any number of network nodes 142 to form a distributed network that maintains a blockchain 146 (see also FIG. 2). Each network node 142 may comprise a computing device, a virtual machine, a server, a work station, and/or the like. Each network node 142a through 142n of blockchain network 140 stores a blockchain record 144 configured to store a copy of a blockchain 146 (see also FIG. 2).

Each network node 142a through 142n may be an instance of a network node 142. The network node 142 may include a hardware processor, memory, and/or circuitry (not explicitly shown) configured to perform any of the functions or actions of the network node 142 described herein. For example, a software application designed using software code may be stored in the memory and executed by the processor to perform the functions of the network node 142. The network node 142 is configured to communicate with other devices and components of the system 100 via the network 110.

Referring to FIG. 2, the blockchain 146 generally refers to a distributed database shared by a plurality of devices or network nodes 142 in a network. The blockchain record 144 stores the blockchain 146. The blockchain 146 comprises blocks 212 which contains every blockchain data entry 216 executed in the network. For example, the blockchain 146 includes a set of blockchain data entries 216a-c executed in blockchain network 140 of FIG. 1.

Blockchain 146 links together blocks 212a-c of data, which store identifiable units called blockchain data entries 216. The blockchain data entry 216 may be interchangeably referred to herein as a blockchain data entry. The blockchain data entries 216a-c, stored in blocks 212a through 212c, may include information, files, and/or any other suitable type of data. For example, blockchain data entries 216a-c may include the non-public information 124 that the security device 150 has determined to be non-public, sensitive, or private. Each of the blockchain data entries 216a-c may be associated with different non-public information 124 (see FIG. 1). Each of the blockchain data entries 216a-c may also include a timestamp of the access to the non-public information 124, attempt to access the non-public information 124, failed attempts to access the non-public information 124, and other information associated with the non-public information 124, classification of an input data 510, among other information described herein. In another example, the blockchain data entries 216a-c may also include information about malicious code 106, malicious users 106, determined action(s) 170 to counter the malicious code 106 or malicious user 106, historical configuration parameters 162, and/or any other information. With every new data transfer (e.g., every new transfer of non-public information 124, indication of a malicious code 106, indication of a malicious user 106, actions 170, input data classification), a new block 212 of data may be generated and added to the blockchain 146.

Each block 212a-c in the blockchain 146 comprises a block identifier (ID) 214a-c and information derived from a preceding block 212a-c. For example, every block 212a-c in the blockchain 146 includes a hash 220a-c of the previous block 212a-c. By including the hash 220a-c, the blockchain 146 comprises a chain of blocks 212a-c from a genesis block 212 (e.g., block 212a or a block before block 212a) to the current block 212c. Each block 212a-c is guaranteed to come after the previous block 212a-c chronologically because the previous block's hash 220a-c would otherwise not be known. In one embodiment, blocks 212a-c in a blockchain 146 may be linked together by identifying a preceding block 212a-c with a cryptographic checksum (e.g. secure hash algorithm (SHA)-256) of its contents (e.g., the non-public information 124 and additional metadata including block ID 214, hash value 218, and previous block hash value 220) which serves as each block's unique identifier. Links are formed by storing the cryptographic checksum identifier of one block 212a-c in the metadata of another block 212*a-c*, such that the former block 212*a-c* becomes the predecessor of the latter block 212*a-c*. In this way, the blocks 212*a-c* form a chain that can be navigated from block-to-block by retrieving the cryptographic checksum of a particular block's predecessor from the particular block's own metadata. Each block 212*a-c* is computationally impractical to modify once it has been in the blockchain because every block 212*a-c* after it would also have to be regenerated. These features protect data stored in the blockchain 146 from being modified by bad actors which provides information security. When a network node 142 creates an entry (e.g. one or more blockchain data entries 216*a-c* in a block 212*a-c*) in its blockchain record 144, the blockchain 146 for all other network nodes 142*a-n* (see FIG. 1) in the distributed network is also updated with the new entry. Thus, data entered in a blockchain 146 is available and accessible to every network node 142*a-n* (see FIG. 1) with a copy of the blockchain record 144. This allows the data stored in the block 212*a-c* to be accessible for inspection and verification at any time by any device with a copy of the blockchain record 144.

Referring back to FIG. 1, the blockchain network 140 is configured to establish consensus among the network nodes 142*a-n* about the present state of the blockchain record 144. For example, each network node 142*a-n* comprises a processor in signal communication with a memory storing software instructions that when executed by the processor, cause the network nodes 142*a-n* to implement a consensus protocol procedure through which all the network nodes 142*a-n* of the blockchain network 140 reach a common agreement about the present state of the blockchain record 144. In this way, each network node 142*a-n* achieves reliability in the blockchain network 140 and establishes trust between the network nodes 142*a-n* in a distributed computing environment. Essentially, the consensus protocol makes sure that every new block 212*a-c* (see FIG. 2) that is added to the blockchain 146 (see FIG. 2) is the one and only version of the truth that is agreed upon by all the block 212*a-c* (see FIG. 2) in the blockchain 146 (see FIG. 2).

Security Device

Security device 150 generally includes a hardware computer system configured to detect malicious code 106 and malicious users 106 attempting to access non-public information 124 associated with the application 122 and its users, and in response to detecting the malicious code or user, implement appropriate countermeasure action(s) 170 to address the detected malicious code or user and protect the non-public information from unauthorized access. In certain embodiments, the security device 150 may be implemented by a cluster of computing devices, such as virtual machines. For example, the security device 150 may be implemented by a plurality of computing devices using distributed computing and/or cloud computing systems in a network. In certain embodiments, the security device 150 may be configured to provide services and resources (e.g., data and/or hardware resources) for the components of the system 100.

The security device 150 comprises a processor 152 operably coupled with a network interface 154 and a memory 156. Processor 152 comprises one or more processors. The processor 152 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 152 may be a programmable logic device, a microcontroller, a microprocessor, or any suitable number and combination of the preceding. The one or more processors are configured to process data and may be implemented in hardware or software. For example, the processor 152 may be 8-bit, 16-bit, 32-bit, 64-bit, or of any other suitable architecture. The processor 152 may include an arithmetic logic unit (ALU) for performing arithmetic and logic operations. The processor 152 may register the supply operands to the ALU and store the results of ALU operations. The processor 152 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 158) to perform the operations of the security device 150 described herein. In this way, processor 152 may be a special-purpose computer designed to implement the functions disclosed herein. In an embodiment, the processor 152 is implemented using logic units, FPGAs, ASICs, DSPs, or any other suitable hardware. The processor 152 is configured to operate as described in FIGS. 1-6. For example, the processor 152 may be configured to perform one or more operations of the operational flow 300 as described in FIG. 3, one or more operations of method 400 as described in FIG. 4, one or more operations of the operational flow 500 as described in FIG. 5, and one or more operations of method 600 as described in FIG. 6.

Network interface 154 is configured to enable wired and/or wireless communications. The network interface 154 may be configured to communicate data between the security device 150 and other devices, systems, or domains. For example, the network interface 154 may comprise an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 152 may be configured to send and receive data using the network interface 154. The network interface 154 may be configured to use any suitable type of communication protocol.

The memory 156 may be volatile or non-volatile and may comprise read-only memory (ROM), random-access memory (RAM), ternary content-addressable memory (TCAM), dynamic random-access memory (DRAM), and static random-access memory (SRAM). The memory 156 may include one or more of a local database, cloud database, network-attached storage (NAS), etc. The memory 156 comprises one or more disks, tape drives, or solid-state drives, and may be used as an over-flow data storage device, to store programs when such programs are selected for execution, and to store instructions and data that are read during program execution. The memory 156 may store any of the information described in FIGS. 1-6 along with any other data, instructions, logic, rules, or code operable to implement the function(s) described herein when executed by processor 152. For example, the memory 156 may store software instructions 158, configuration parameters 160, historical configuration parameters 162, context detection machine learning module 164, graph nodal machine learning module 166, threshold rates 168, actions 170, particular period 172, input data 510, credentials 524, 526, feature vectors 514*a,b*, keywords 516, authorization instructions 520, request 522, a robotic processing automation (RPA)

code 174, and/or any other data or instructions. The software instructions 158 may comprise any suitable set of instructions, logic, rules, or code operable to execute the processor 152 and perform the functions described herein, such as some or all of those described in FIGS. 1-6.

The configuration parameters 160 may include a number of visits to the application 122, a location (e.g., Global Positioning System (GPS) location coordinate) from which the application 122 is visited, a number of times the database 130 associated with the application 122 is accessed, a number of failed login attempts at the application 122, a number of successful login attempts at the application 122, a number of failures to load one or more web pages associated with the application 122, a number of API calls made to the application 122 (e.g., from the application database 130 or other databases), a number of API responses made by the application 122, a number of times the application 122 is accessed, system file configurations, Graphical User Interface (GUI) headless attempts, interaction session durations with the application 122, a number of bounced pages or requests, conversation history, webpage engagement metrics (e.g., click per second for each button, etc.), API transfer rate, among others. In certain embodiments, the configuration parameters 160 may include a rate per unit time, e.g., per minute, per day, per week, etc. of these examples. The security device 150 may extract values for each of the configuration parameters 160 and use them to detect anomalies or spikes in any of the values of configuration parameters 160 compared to the counterpart historical configuration parameters 162. This process is described in greater detail further below in conjunction with FIG. 3.

The historical configuration parameters 162 may provide information about historical events that occurred on the application 122. For example, the historical configuration parameters 162 may include historical records or values for a number of visits to the application 122, locations (e.g., GPS location coordinate) from which the application 122 is visited, a number of times the database 130 associated with the application 122 is accessed, a number of failed login attempts at the application 122, a number of successful login attempts at the application 122, a number of failures to load one or more web pages associated with the application 122, a number of API calls made to the application 122 (e.g., from the application database 130 or other databases), a number of API responses made by the application 122, a number of times the application 122 is accessed, system file configurations, GUI headless attempts, (or rate per unit time), interaction session durations with the application 122, a number of bounced pages or requests, conversation history, webpage engagement metrics (e.g., click per second for each button, etc.), API transfer rate, among others. In certain embodiments, the historical configuration parameters 162 may include a rate per unit time, e.g., per minute, per day, per week, etc. of these examples. The security device 150 may determine the average value of each of the historical configuration parameter 162 to compare with a counterpart configuration parameter 160.

The context detection machine learning module 164 may be implemented by the processor 152 executing the software instructions 158, and is generally configured to determine the classification of the input data 510 on the application 122, e.g., input from the users and/or input from code (e.g., automated input). In certain embodiments, the context detection machine learning module 164 may include a support vector machine, neural network, random forest, k-means clustering, Tree-based algorithm, Random Forest algorithm, etc. In certain embodiments, the context detection machine learning module 164 may include text processing, Natural Language Processing (NLP) algorithms, and the like. In certain embodiments, the context detection machine learning module 164 may be implemented by a plurality of neural network layers, convolutional neural network layers, Long-Short-Term-Memory (LSTM) layers, Bi-directional LSTM layers, recurrent neural network layers, and the like. The context detection machine learning module 164 may be implemented by supervised, semi-supervised, or unsupervised training algorithms.

In certain embodiments, the context detection machine learning module 164 may perform word segmentation, sentence segmentation, word tokenization, sentence tokenization, sentiment analysis, and/or the like to process and analyze each word from the input 126 on the application 122. In certain embodiments, the context detection machine learning module 164 may analyze the input 126 from both ends to determine the context of the input 126.

In a training stage, the context detection machine learning module 164 may be trained using a training dataset that includes a plurality of sample text data each labeled with an indication of public or non-public information. For example, the sample text data may include particular keywords 156 that are labeled with non-public information 124. The context detection machine learning module 164 may extract a set of features from the sample text data. The set of features may include words, the meaning of the words, the meaning of each string of text, numbers, the data field associated with each number, symbols, etc. The output of this operation may be a feature vector that indicates if the sample data includes one of the particular keywords that are known to be non-public information 124. The context detection machine learning module 164 may learn the associations between each sample text data and its respective label. In this way, the context detection machine learning module 164 may determine the context of each sample text data, e.g., the meaning of it, whether is it a social security number, a profile number, a name, an address, a phone number, etc. Based on the context of the sample text data and comparing each text data with the particular keywords that are known to be non-public information, the context detection machine learning module 164 may determine whether each text data is non-public information or public information.

In the testing stage, the context detection machine learning module 164 is given a set of unlabeled text and is asked to predict the context of the text and if the text includes non-public information. The context detection machine learning module 164 may extract a set of features from the unlabeled text. The set of features may include words, the meaning of the words, the meaning of each string of text, numbers, the data field associated with each number, symbols, etc. The context detection machine learning module 164 may determine the context of the text based on the extracted features and compare them with the set of features associated with the labeled sample text data from the training dataset. The context detection machine learning module 164 may also determine if the unlabeled text includes non-public information if it includes at least one of the particular keywords 156 that are known to be non-public information. In this process, the context detection machine learning module 164 may compare the extracted features (represented by a first feature vector comprising numbers) from the unlabeled text with the extracted features (represented by a second feature vector comprising numbers) from each particular keyword. In other words, the context detection machine learning module 164 may determine the similarity score between unlabeled text and each particular keyword. To this end, the context detection machine learning module 164 may determine the Euclidean distance between the first and second feature vectors. If the Euclidean distance is less than a threshold (e.g., less than 2%, 1%, etc.), the context detection machine learning module 164 may determine that the word in the unlabeled text is non-public information (e.g., the particular keyword). Otherwise, the context detection machine learning module 164 may determine that the word in the unlabeled text is public information. The context detection machine learning module 164 may perform similar operations for each word from the unlabeled text data to compare with each of the particular keywords. In a refining stage and in backpropagation, the context detection machine learning module 164 may update the weight and bias values of the neural networks to increase the accuracy of the prediction of the context detection machine learning module 164.

The graph nodal machine leaning module 166 may be implemented by the processor 152 executing the software instructions 158, and is generally configured to detect anomalies between the configuration parameters 160 and counterpart historical configuration parameters 162, detect the malicious code 106 and malicious users 109, determine the functions of the malicious code 106 and the malicious user 109, and determine appropriate action(s) 170 to address the malicious code 106 and/or the malicious user 109 based on the function of the malicious code 106 and malicious user 109, and protect the non-public information 124 from unauthorized access. In certain embodiments, the graph nodal machine leaning module 166 may include a support vector machine, neural network, random forest, k-means clustering, Tree-based algorithm, Random Forest algorithm, etc. In certain embodiments, the graph nodal machine leaning module 166 may include text processing, NLP algorithms, and the like. In certain embodiments, the graph nodal machine leaning module 166 may be implemented by a plurality of neural network layers, convolutional neural network layers, LSTM layers, Bi-directional LSTM layers, recurrent neural network layers, and the like. The graph nodal machine leaning module 166 may be implemented by supervised, semi-supervised, or unsupervised training algorithms.

The graph nodal machine leaning module 166 may be trained to learn the association between each malicious code 106 and a particular action 170 that is determined to lead to the shortest path to addressing the malicious code 106 and protecting the non-public information 124 from unauthorized access. In this process, the graph nodal machine leaning module 166 may be trained using a training dataset that includes a plurality of sample data each indicating a function 108 of a different malicious code 106. The graph nodal machine leaning module 166 may extract a set of features from each sample data and associate the extracted features to the label of the sample data, e.g., the function 108 of the malicious code 106. The set of features indicates words or text that indicates the function 108 of the malicious code 106. In certain embodiments, the graph nodal machine leaning module 166 may perform word segmentation, sentence segmentation, word tokenization, sentence tokenization, and/or the like to process and analyze each sample data. The graph nodal machine leaning module 166 may learn to associate each sample data to the respective label.

In a testing stage, the graph nodal machine leaning module 166 may be given a set of unlabeled malicious codes and is asked to predict the function of the malicious code (while it is executed on the application) and an appropriate action to address the malicious code.

The graph nodal machine leaning module 166 may extract a set of features from the malicious code. The extracted set of features may indicate the anomalies between the configuration parameters 160 and counterpart configuration parameters 162 caused by the malicious code. Based on the detected anomalies, the graph nodal machine leaning module 166 may determine the function of the malicious code. The extracted set of features may be represented by a first feature vector that includes numerical values.

The graph nodal machine leaning module 166 may compare the set of features (represented by the first feature vector) extracted from the unlabeled malicious code with the set of features (represented by a second feature vector) extracted from each labeled malicious code from the training dataset. In other words, the graph nodal machine leaning module 166 may determine the similarity score between the function of the unlabeled malicious code and the function of each labeled malicious code from the training dataset. To this end, the graph nodal machine leaning module 166 may determine the Euclidean distance between the first and second feature vectors. If the Euclidean distance is less than a threshold (e.g., less than 2%, 1%, etc.), the graph nodal machine leaning module 166 may determine that the function of the unlabeled malicious code is similar to (or the same as) the function of the labeled malicious code from the training dataset. In response, the graph nodal machine leaning module 166 may predict that the action 170 that is labeled to the malicious code can also address and/or counter the unlabeled malicious code. The graph nodal machine leaning module 166 may perform similar operations for functions from the operations of the malicious users 109. In the refining stage and in backpropagation, the graph nodal machine leaning module 166 may update the weight and bias values of the neural networks to increase the accuracy of the prediction of the graph nodal machine leaning module 166.

The actions 170 may generally include any countermeasure action that counters or addresses malicious code 106 and/or malicious users 109. Examples of the actions 170 may include, but are not limited to, blocking network communications originating from an Internet Protocol (IP) address associated with the malicious code 106 and/or the malicious user 109, rerouting the network communications originated from the IP address associated with the malicious code 106 and/or the malicious user 109, adding the IP address associated with the malicious code 106 and/or the malicious user 109 to a firewall configuration as a malicious IP address, and installing or deploying a software security patch on the computing device 120 from which the application 122 is accessed, logging out from a user profile from which the application 122 is accessed, among others.

The RPA code 174 may be an automated code script implemented by the processor 152, and is generally configured to perform repetitive operations as specified in the RPA code 174. For example, as part of a workflow for executing a particular task, the RPA code 174 may be programmed to access non-public information 124 on the application 122 to complete the particular task. The particular task may be creating profiles for multiple users 102 or any other task that may require repetitive operations, for example. The RPA code 174 may be programmed (i.e., configured) to perform a series of specific operations to create user accounts by accessing names, addresses, and other non-public information 124 that is available on the application 122. The RPA code 174 may be programmed by a developer.

The authentication instruction 520 may include software code instructions that when executed by the security device

150, a user interface comprising data fields is displayed on a screen to enter credentials, such as username and password, a security code sent separately to a device associated with the user profile associated with the authorized user from which the application 122 is being accessed, among others.

Operational Flow for Detecting Malicious Code

Figure 3:
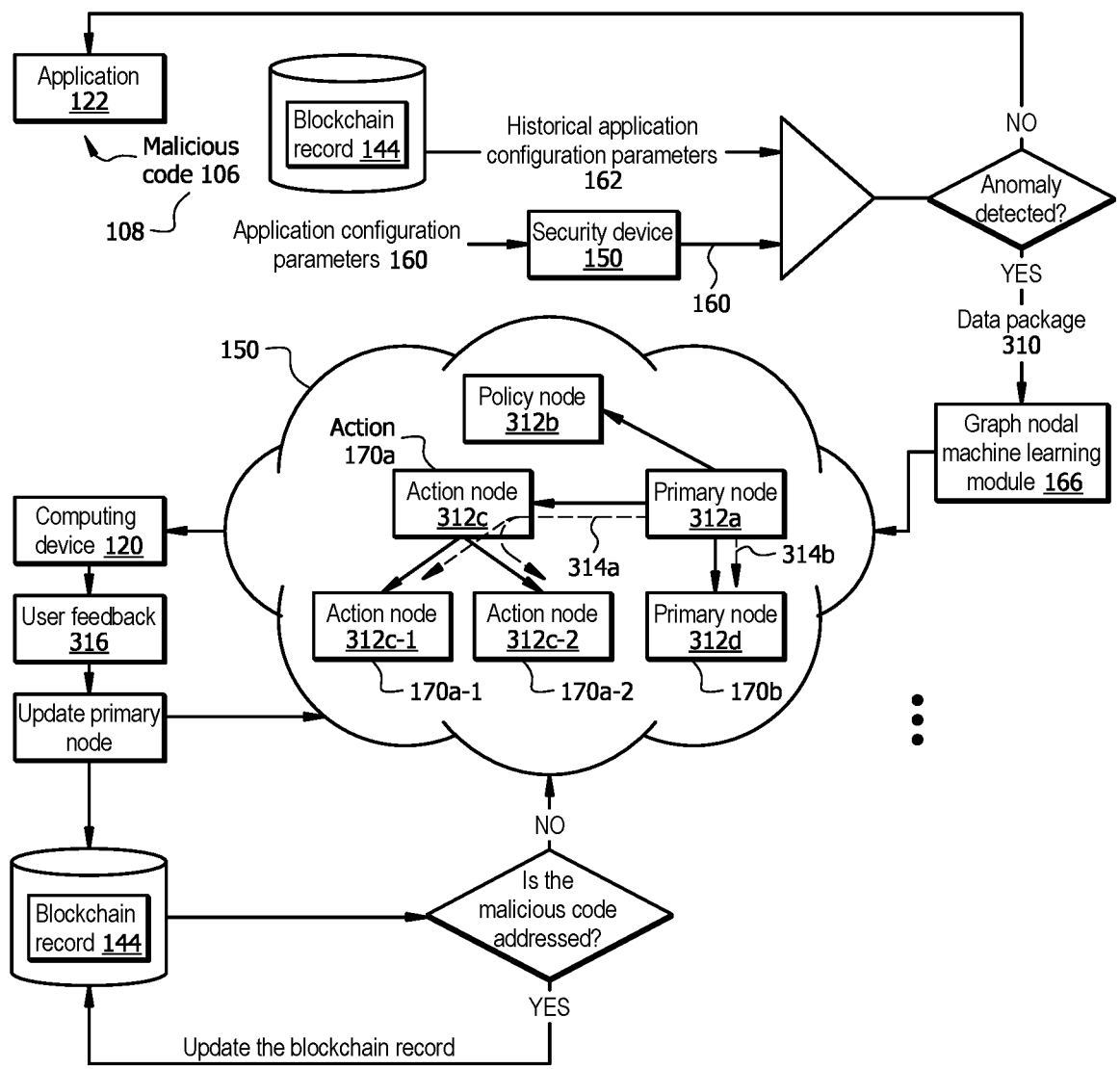
FIG. 3 illustrates an example operational flow of the system of FIG. 1 for detecting and addressing a malicious code.

FIG. 3 illustrates an operational flow 300 of system 100 (see FIG. 1) for detecting malicious code 106 attempting to access non-public information 124 associated with the application 122 and its users, and in response to detecting the malicious code 106, implementing appropriate countermeasure action(s) 170 to address the detected malicious code 106 and protecting the non-public information 124 from unauthorized access.

In an example scenario, an RPA code 174 may be executed on the application 122 to minimize manual efforts by automating repetitive processes. The malicious code 106 may be launched to gain unauthorized access to the non-public information 124. In some cases, when a RPA code 174 is executed to access non-public information 124 and perform a predetermined task, a malicious code 106 may be launched on top of the RPA code 174 in an attempt to bypass the RPA code 174 and access the non-public information 124. In certain embodiments, the operations described herein may be in conjunction with a case where the RPA code 174 is executed on the application 122 to perform a particular task, such as creating profiles for multiple users 102.

The operational flow 300 may be in operation continuously, periodically (e.g., every second, every ten seconds, every minute, etc.), or on demand. For example, the operational flow 300 may begin when the security device 150 detects a set of configuration parameters 160 (e.g., configuration parameter values) associated with the application 122. The set of configuration parameters 160 may provide information about events that are accruing with respect to the application 122, e.g., on the backend operations. Examples of configuration parameters 160 are described in the discussion of FIG. 1. In response to detecting the set of configuration parameters 160, the security device 150 may perform the following operations on each configuration parameter 160. For example, the security device 150 may compare each configuration parameter 160 with a counterpart historical configuration parameter 162 retrieved from the blockchain record 144.

Determining Whether a Configuration Parameter is Anomalous

The security device 150 may determine each configuration parameter 160 over a particular period 172. The particular period 172 may be one second, one minute, ten minutes, etc. With respect to a first configuration parameter 160, the security device 150 may determine the first configuration parameter 160 over the particular period 172. The security device 150 may compare the first configuration parameter 160 with a counterpart historical configuration parameter 162. The security device 150 may determine a difference between the first configuration parameter 160 and the counterpart historical configuration parameter 162. The security device 150 may determine whether the difference between the first configuration parameter 160 and the counterpart historical configuration parameter 162 exceeds the threshold rate 168. The threshold rate 168 may be one per minute, ten per seconds, ten per minute, one per day, five per day, ten per week, etc. In each comparison between a configuration parameter 160 and a counterpart historical configuration parameter 162, a different threshold rate 168 may be used. In certain embodiments, the threshold rates 168 may be configurable by an administrator.

In certain embodiments, the security device 150 may determine an average of each counterpart historical configuration parameter 162 and compare each configuration parameter 160 to the average of the counterpart historical configuration parameter 162. For example, with respect to failed login attempts as the first configuration parameter 160, the security device 150 may determine that the average of the failed login attempts as indicated by the historical records of failed login attempts is five per minute until the login attempt is successful. In response, the security device 150 may compare the failed login attempts with the average of failed login attempts to determine if the failed login attempts exceed the average of the failed login attempts by the threshold rate 168. In another example, with respect to GPS location of a computing device 120 from which the application 122 is accessed, if it is determined that the application 122 is accessed from an unexpected GPS location that is previously known to be untrusted—meaning that it is associated with malicious code or malicious users, the security device 150 may determine that the malicious code or malicious user is attempting to access the application 122. The security device 150 may determine the GPS location of the computing device 120 based on the IP address of data communication (e.g., malicious code) coming from the computing device 120.

If the security device 150 determines that the difference between the first configuration parameter 160 and the counterpart historical configuration parameter 162 exceeds the threshold rate 168, the security device 150 may determine that the configuration parameter 160 is anomalous. If, however, the security device 150 determines that the difference between the first configuration parameter 160 and the counterpart historical configuration parameter 162 does not exceed the threshold rate 168, the security device 150 may determine that the configuration parameter 160 is not anomalous. In response, the security device 150 continues to monitor and extract other configuration parameters 160. The security device 150 may perform similar operations to evaluate each configuration parameter 160.

Determining a Function of the Malicious Code

In certain embodiments, in response to determining that the difference between the first configuration parameter 160 and the counterpart historical configuration parameter 162 exceeds the threshold rate 168, the security device 150 may determine that a malicious code 106 is executed on the application 122. The malicious code 106 may be executed on the application 122 by a bad actor, e.g., the malicious user 109 via cyberattack.

In certain embodiments, the security device 150 may detect that the malicious code 106 is executed on the application 122, if more than a threshold number (e.g., more than 80%, 70%, etc.) of configuration parameters 160 are deviating from counterpart historical configuration parameters 162 by more than the respective threshold rates 168.

In response to detecting the malicious code 106, the security device 150 may generate a data package 310 and feed it to the graph nodal machine learning module 166. The data package 310 may include the anomalous configuration parameter(s) 160, event log records that include events that occurred with respect to the application 122, and/or any other data associated with the application 122.

The security device 150 may implement the graph nodal machine learning module 166 to detect malicious code 106, determine the function(s) 108 of the malicious code 106, and determine appropriate action(s) 170 to address the malicious code 106 based on the function(s) 108 of the malicious code 106, and protect the non-public information 124 from malicious code 106.

As illustrated in FIG. 3, the security device 150 may be implemented on a cloud network and the graph nodal machine learning module 166 may be deployed on the distributed cloud platform. In certain embodiments, the graph nodal machine learning module 166 may include a primary node 312a, a policy node 312b, and one or more action nodes 312c-d. Each of the nodes 312a-d may be an instance of the node 312. In certain embodiments, each of the primary node 312a, policy node 312b, and one or more action nodes 312c-d may correspond to a portion of software code/instructions associated with the graph nodal machine learning module 166.

In certain embodiments, each of the primary node 312a, policy node 312b, and one or more action nodes 312c-d may correspond to a computing device, e.g., a member of the distributed cloud platform that is configured to perform respective operations described herein. In certain embodiments, each of the primary node 312a, policy node 312b, and one or more action nodes 312c-d may include a hardware processor, memory, and/or circuitry (not explicitly shown) configured to perform any of the functions or actions of the respective node 312a-d. For example, a software application designed using software code may be stored in the memory and executed by the processor to perform the functions of the node 312a-d. Each node 312a-d is configured to communicate with other devices and components of the system 100 (see FIG. 1) via the network 110 (see FIG. 1).

In response to receiving the data package 310, the primary node 312a may access, parse, and analyze the data package 310 using an NLP algorithm, text processing, object-oriented programming language, and the like to determine the intent or function 108 of the malicious code 106. In certain embodiments, the graph nodal machine learning module 166 (e.g., via the primary node 312a) may determine the function 108 of the malicious code 106 based on the effect that it has on the configuration parameters 160 of the application 122. For example, the graph nodal machine learning module 166 (e.g., via the primary node 312a) may determine the function 108 of the malicious code 106 based on analyzing the inconsistencies and differences between the configuration parameters 160 and the historical configuration parameters 162 that is described above. In other words, the graph nodal machine learning module 166 (e.g., via the primary node 312a) may determine the function 108 of the malicious code 106 based on the anomalous configuration parameters 160 that are determined to be deviating from counterpart historical configuration parameters 162 more than respective threshold rates 168.

In certain embodiments, determining the function 108 of the malicious code 106 based on the anomalous configuration parameters 160 may include in response to determining that a number of failed login attempts exceeds a respective threshold rate 168, determining that the function 108 of the malicious code 106 comprises gaining unauthorized access to a user profile (associated with the user 102) and non-public information 124 associated with the user 102 and application 122.

In certain embodiments, determining the function 108 of the malicious code 106 based on the anomalous configuration parameters 160 may include in response to determining that each of a number of accesses to the application database 130 associated with the application 122 and/or a number of failures to load one or more web pages (or menu items, other components), associated with the application 122 exceeds a respective threshold rate 168, determining that the function 108 of the malicious code 106 comprises causing performance degradation and/or network traffic congestion at the application 122.

In certain embodiments, determining the function 108 of the malicious code 106 based on the anomalous configuration parameters 160 may include in response to determining that each of a number of API requests made by the application 122 (to fetch data from the application database 13) and a number of API responses made by the application 122 exceeds respective threshold rates 168, determining that the function 108 of the malicious code 106 comprises causing network traffic congestion and/or performance degradation at the application 122.

In certain embodiments, determining the function 108 of the malicious code 106 based on the anomalous configuration parameters 160 may include in response to determining that inbound and/or outbound network traffic at the application 122 exceeds a respective threshold rate 168, determining that the function 108 of the malicious code 106 comprises causing network traffic congestion and/or performance degradation at the application 122. The inbound and/or outbound network traffic may include any data package communication, such as data to maintain the application 122, data to present to users, data received on the application 122, etc.

The policy node 312b may include a set of policy rules that the graph nodal machine learning module 166 and primary node 312a may follow. For example, the policy node 312b may include a policy rule that indicates to do not terminate an interaction session at the application 122 mid-session or before completion, and either roll back the interaction session to the beginning or allow the interaction session to be completed. The interaction session, in one example, can include a case where a user requests to receive a service or product from the application 122, access particular data from the application 122, etc. In another example, the policy node 312b may include a policy rule that indicates a user is not allowed to retry to authenticate themselves more than a threshold number of times per particular period (e.g., more than three times in five minutes, more than five times in six minutes, etc.) when the user is trying to login to the application 122 or when the user is trying to access non-public information 124 that is masked by the security device 150. This process is described in greater detail in the discussion of FIG. 5.

Addressing the Malicious Code

In response to determining the function 108 of the malicious code 106, the graph nodal machine learning module 166 (e.g., via the primary node 312a) may determine one or more actions 170 to counter the malicious code 106. In this process, in certain embodiments, the graph nodal machine learning module 166 (e.g., via the primary node 312a) may generate one or more action nodes 312c to 312d. Each action node 312c-d may include software instructions (e.g., actions 170) to be executed by the security device 150 and/or the application 122. For example, each action node 312c-d may represent and/or include a different action 170.

In certain embodiments, the security device 150 may deploy one or more actions nodes 312a to 312d (e.g., computing device(s) in the cloud computing platform) that may store software instructions (e.g., actions 170) to be executed by the security device 150 and/or the application 122. As can be seen in FIG. 3, the action node 312c may include or be associated with the action 170a, action node 312a-1 may include or be associated with action 170a-1, action node 312*a*-2 may include or be associated with action 170*a*-2, and action node 312*d* may include or associated with action 170*b*. each of the actions 170*a*, 170*a*-1, 170*a*-2, and 170*b* may an instance of action 170.

The graph nodal machine learning module 166 (e.g., via the primary node 312*a*) may determine the shortest path comprising the least number of action nodes 312*c*-*d* that would address and counter the malicious code 106.

In the illustrated example, the first path 314*a* comprises action node 312*a*, action nodes 312*c*-1 and 312*c*-2 and may correspond to a particular sequence of actions 170*a*, 170*a*-1, 170*a*-2 that are performed in the illustrated order. For example, if the first path 314*a* is selected to be executed, action 170*a* is executed, then, action, 170*a*-1, and then, action 170*a*-2 by the security device 150 (e.g., via the graph nodal machine learning module 166 and the primary node 312*a*) and/or by the application 122.

In a particular example, the first path 314*a* may include blocking network communications originated from the IP address associated with the malicious code 106 (as action 170*a*), adding the IP address associated with the malicious code 106 to a firewall configuration as a malicious IP address (as action 170*a*-1), and deploying a security patch to the application 122 to remove remaining malicious code or files (as action 170*a*-2). In response, the security patch may be installed or executed on the application 122. In this particular example, the first path 314*a* may be selected if the function 108 of the malicious code 106 is determined to be attempting to gain unauthorized access to the non-public information 124 from the application 122 and/or any other function 108 described herein.

Likewise, in the illustrated example, the second path 314*b* comprises action node 170*b* and may correspond to a particular action 170*b*. Thus, if the second path 314*b* is selected to be executed, action 170*b* is executed by the security device 150 (e.g., via the graph nodal machine learning module 166 and the primary node 312*a*) and/or the application 122. In a particular example, the second path 314*b* may include rerouting the network communication originating from the IP address associated with the malicious code 106 (as action 170*b*). In this particular example, the second path 314*b* may be selected if the function 108 of the malicious code 106 is determined to be causing performance degradation at the application 122 and/or any other function 108 described herein. In other examples, any number of action nodes 312 may be generated by the primary node 312*a*, and any number of action nodes 312 may be included in a given path 314.

In certain embodiments, determining the one or more actions 170 to counter the malicious code 106 based on the function 108 of the malicious code 106 may include determining that the one or more actions 170 may comprise blocking network communications originating from the IP address of the malicious code 106 and/or adding the IP address of the malicious code 106 to a firewall configuration as a malicious IP address and/or any other action 170 described herein, in response to determining that the malicious code 106 is executed to gain unauthorized access to the non-public information 124 associated with the application 122 and/or any other function 108.

In certain embodiments, determining the one or more actions 170 to counter the malicious code 106 based on the function 108 of the malicious code 106 may include determining that the one or more actions 170 may comprise rerouting the network communications coming from the IP address associated with the malicious code 106 to another application, e.g., an application with more security and monitored by authorities and/or any other action 170 described herein, in response to determining that the malicious code 106 is executed to cause performance degradation at the application 122 and/or any other function 108.

In certain embodiments, determining the one or more actions 170 to counter the malicious code 106 based on the function 108 of the malicious code 106 may include determining that the one or more actions 170 may comprise rerouting the network communications coming from the IP address associated with the malicious code 106 to another application, e.g., an application with more security and monitored by authorities and/or any other action 170, in response to determining that the malicious code 106 is executed to cause network traffic congestion at the application 122 and/or any other function 108.

Similarly, the security device 150 may implement the graph nodal machine learning module 166 to detect malicious user 109 attempting to tamper with the application 122, determine the functions/intent of the malicious user 109, and determine appropriate action(s) 170 to address the malicious user 109 based on the intent of the malicious user 109, and protect the non-public information 124 from unauthorized access. This process is described in greater detail in the discussion of FIGS. 5 and 6.

In certain embodiments, in response to determining the one or more actions 170 to address and counter the malicious code 106, the security device 150 may execute at least one of the one or more actions 170. In certain embodiments, the security device 150 may select one or more particular actions 170 to be executed that would lead to the shortest path 314 comprising the least number of actions 170 to address and counter the malicious code 106, e.g., based on the learned associations between a set of malicious code, each labeled with respective functions 108 and actions 170 previously determined to address and counter the malicious code as indicated in the training dataset described in FIG. 1.

In certain embodiments, in response to determining the one or more actions 170 to address and counter the malicious code 106, the security device 150 may communicate the one or more actions 170 to the computing device 120, e.g., to be displayed in the foreground of the application 122. The user 102 may confirm, update, and/or override one or more actions 170. In other words, the user may provide user feedback 316 on the one or more actions 316. The security device 150 may use the user feedback 316 (as part of the training dataset described in FIG. 1) to improve the accuracy of the operations of the graph nodal machine learning module 166.

In certain embodiments, the security device 150 may display one or more actions 170 as options on a screen of the computing device 120. The user may select one or more of the actions 170 to be executed by the application or the security device 150. The security device 150 may use the user input as feedback 316 for further events where the malicious code 106 is detected to have been executed on applications 122, such that when the malicious code 106 is detected to have been executed on a second application, the one or more actions 170 are executed on the second application.

The security device 150 may store the user feedback 316, the one or more actions 170, the malicious code 106, and the function 108 of the malicious code 106, among other data learned during these operations in the blockchain record 144 as a new block (212 in FIG. 2).

The security device 150 may monitor the application 122 (and its configuration parameters 160) to determine whether the malicious code 106 is addressed. In other words, the security device 150 may determine if the previously detected anomalies, differences, and inconsistencies between the configuration parameters 160 and the counterpart historical configuration parameters 162 are resolved or still exist.

If the security device 150 determines that the previously detected anomalies, differences, and inconsistencies between the configuration parameters 160 and the counterpart historical configuration parameters 162 no longer exist, the security device 150 may determine that the malicious code 106 is addressed and countered. Otherwise, the security device 150 may determine that the malicious code 106 is not addressed and feeds this information to the graph nodal machine learning module 166 to re-evaluate the malicious code 106 and determine more accurate action(s) 170 to address and counter the malicious code 106. The security device 150 may repeat this iterative operation until it is determined that the malicious code 106 is addressed and countered. If the security device 150 determines that the malicious code 106 is addressed and countered, the security device 150 may update the blockchain record 144 to include that the action(s) 170 addressed and countered the malicious code 106.

In certain embodiments, the security device 150 may detect a user interaction session at the application 122. The user interaction session may involve a user attempting to access a user profile on the application 122, accessing particular data from the application 122, requesting a service or product from the application 122, etc., for example. The security device 150 may terminate the user interaction session in response to determining that the malicious code 106 is executed on the application 122.

Example Method for Detecting and Addressing a Malicious Code

Figure 4:
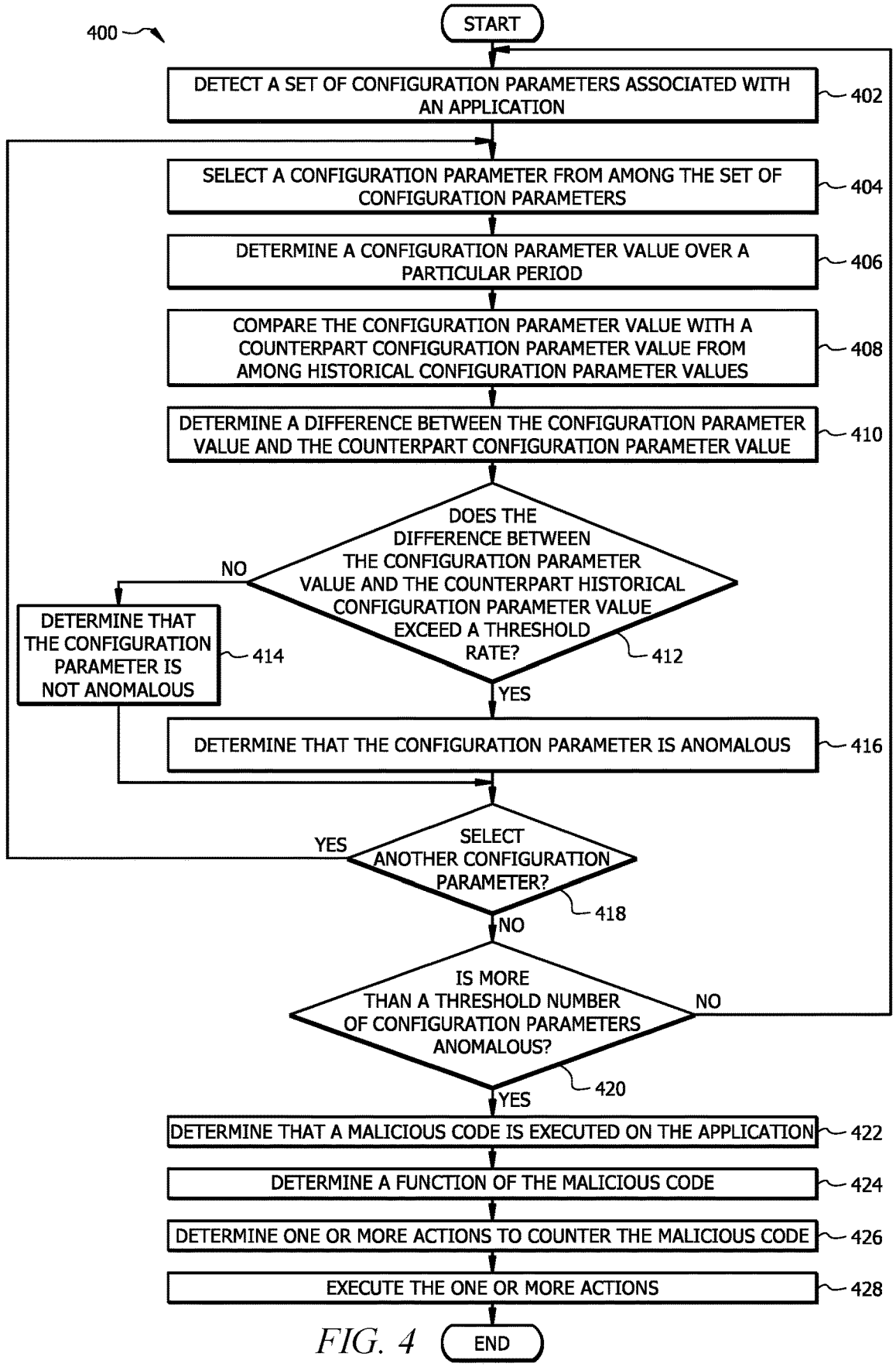
FIG. 4 illustrates an example flowchart of a method for detecting and addressing a malicious code.
Figure 5:
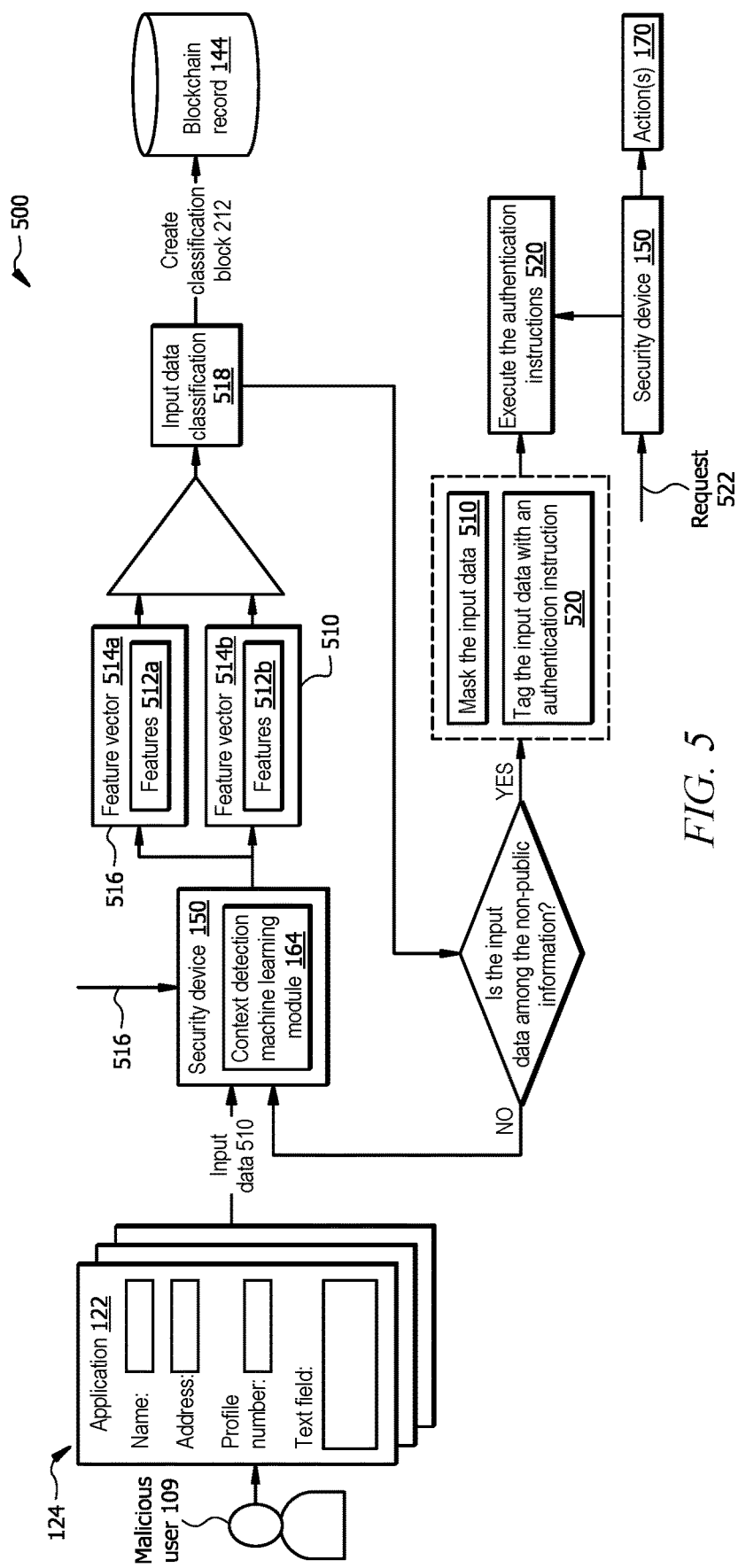
FIG. 5 illustrates an example operational flow of the system of FIG. 1 for protecting non-public information from malicious users.

FIG. 4 illustrates an example flowchart of a method 400 for detecting and addressing a malicious code. Modifications, additions, or omissions may be made to method 400. Method 400 may include more, fewer, or other operations. For example, operations may be performed in parallel or in any suitable order. While at times discussed as the system 100, security device 150, computing device 120, blockchain network 140, or components of any of thereof performing operations, any suitable system or components of the system 100 may perform one or more operations of the method 400. For example, one or more operations of method 400 may be implemented, at least in part, in the form of software instructions 158 of FIG. 1, stored on non-transitory, tangible, machine-readable media (e.g., memory 156 of FIG. 1) that when run by one or more processors (e.g., processor 152 of FIG. 1) may cause the one or more processors to perform operations 402-428.

At operation 402, the security device 150 detects a set of configuration parameters 160 associated with an application 122. For example, the security device 150 may monitor the application 122 and the events that occur with respect to the application 122 to detect the configuration parameters 160, similar to that described in FIGS. 1 and 3. The security device 150 may detect the configuration parameters 160 in real-time, periodically (e.g., every second, every five seconds, etc.) or on demand.

At operation 404, the security device 150 may select a configuration parameter 160 from among the set of configuration parameters 160. The security device 150 may iteratively select a configuration parameter 160 until no configuration parameter 160 is left for evaluation.

At operation 406, the security device 150 determine the configuration parameter value (also referred to herein as the configuration parameter 160) over a particular period 172.

At operation 408, the security device 150 compares the configuration parameter value 160 with a counterpart configuration parameter value 162 from among historical configuration parameter values 162. For example, the security device 150 may fetch the historical configuration parameter value 162 from the blockchain record 144 and compare it to the configuration parameter value 160.

At operation 410, the security device 150 determines a difference between the configuration parameter value 160 and the counterpart configuration parameter value 162.

At operation 412, the security device 150 determines whether the difference between the configuration parameter value 160 and the counterpart historical configuration parameter value 162 exceeds a threshold rate 168. If it is determined that the difference between the configuration parameter value 160 and the counterpart historical configuration parameter value 162 exceeds a threshold rate 168, the method 400 proceeds to operation 416. Otherwise, method 400 proceeds to operation 414.

At operation 414, the security device 150 determines that the configuration parameter 162 is non anomalous. At operation 416, the security device 150 determines that the configuration parameter 160 is anomalous.

At operation 418, the security device 150 determines whether to select another configuration parameter 160. The security device 150 may select another configuration parameter 160 if at least one configuration parameter 160 is left for evaluation. If the security device 150 determines to select another configuration parameter 160, the method 400 returns to operation 404. Otherwise, method 400 proceeds to operation 420.

At operation 420, the security device 150 determines whether more than a threshed number of configuration parameters 160 are anomalous, for example, based on the results of the operations 414 and 416. The threshold number may be zero, one, two, three, etc.

If it is determined that more than the threshold number of configuration parameters 160 are anomalous, method 400 proceeds to operation 422. Otherwise, method 400 returns to operation 402. Therefore, if at least one configuration parameter 160 is determined to be anomalous, method 400 may proceed to operation 422.

At operation 422, the security device 150 determines that a malicious code 106 is executed on the application 122. For example, the security device 150 may determine that the cause of the anomalous configuration parameter(s) 160 is the malicious code 106.

At operation 424, the security device 150 determines a function 108 of the malicious code 106, for example, based on analyzing the anomalous configuration parameters 160, similar to that described in FIG. 3. At operation 426, the security device 150 determines one or more actions 170 to counter the malicious code 106, similar to that described in FIG. 3. At operation 428, the security device 150 executes the one or more actions 170, similar to that described in FIG. 3.

Operational Flow for Protecting Non-Public Information from Malicious Users

FIG. 3 illustrates an example operational flow 500 of system 100 (see FIG. 1) for protecting non-public information from malicious users 109. The operational flow 500 may begin when a user enters input data 510 to the application 122. The input data 510 may include non-public information 124 and/or other types of information. For example, the input data 510 may include text, numbers, name, address, profile number, serial number, etc. The security device 150 captures the input data 510 from the application 122.

Determining the Context of the Input Data

The security device 150 may feed the input data 510 to the context detection machine learning module 164 to determine the context and meaning of each input data 510, similar to that described in FIG. 1. To this end, the context detection machine learning module 164 may analyze each input data 510. The security device 150 (e.g., via the context detection machine learning module 164) may perform the following operations for each input data 510.

The security device 150 (e.g., via the context detection machine learning module 164) may extract a set of features 512*a* from the input data 510. The set of features 512*a* may include an indication of the meaning of the input data 512 and other characteristics about the input data 512, such as sentiment, length, position in a sentence (if applicable), a data field in which the input data 512 is added to (e.g., name data field, address data field, profile number data field, text data field, etc.), among others. The set of features 512*a* may be represented by a first feature vector 514*a* that comprises a set of numerical values.

The security device 150 (e.g., via the context detection machine learning module 164) may perform a similar operation on each keyword 516 from a bag of keywords 516 that are known to be or associated with non-public information 124. In this process, the security device 150 (e.g., via the context detection machine learning module 164) may extract a set of features 512*b* from each keyword 516. The set of features 512*b* extracted from a keyword 516 may include an indication of the meaning of the keyword 516 and other characteristics of the keyword 516, such as sentiment, etc. The set of features 512*b* may be represented by a second feature vector 514*b* that comprises a set of numerical values.

The security device 150 (e.g., via the context detection machine learning module 164) may compare each input data 510 to each keyword 516. In this process, with respect to a comparison between a first input data 510 and a first keyword 516, the security device 150 (e.g., via the context detection machine learning module 164) may compare the features 512*a* (extracted from the first input data 510) with features 512*b* (extracted from the first keyword 516).

In certain embodiments, comparing the feature 512*a* with feature 512*b* may include comparing each of the first set of numerical values in the first feature vector 512*a* with a counterpart numerical value from the second feature vector 512*b*. In other words, the security device 150 (e.g., via the context detection machine learning module 164) compares the feature vector 514*a* to the feature vector 514*b*. In this process, the security device 150 (e.g., via the context detection machine learning module 164) may determine the Euclidean distance between the feature vector 514*a* and the feature vector 514*b*. If the Euclidean distance between the feature vectors 514*a* and 514*b* is less than a threshold percentage (e.g., less than 1%, 2%, etc.), the security device 150 (e.g., via the context detection machine learning module 164) may determine that the first input data 510 corresponds to the first keyword 516 and/or the non-public information 124.

In certain embodiments, determining that a first input data 510 corresponds to the non-public information 124 comprises determining that more than a threshold percentage of the first set of numerical values from the feature vector 514*a* (e.g., more than 80%, 90%, etc.) corresponds to counterpart numerical values from among the second set of numerical values from the feature vector 514*b*. Therefore, if the security device 150 (e.g., via the context detection machine learning module 164) determines that the features 512*a* corresponds to the features 512*b*, it is determined that the input data 510 (that is being evaluated) includes or corresponds to the non-public information 124. The security device 150 (e.g., via the context detection machine learning module 164) may perform a similar operation for evaluating each input data 510.

Classifying the Input Data

In response, the security device 150 (e.g., via the context detection machine learning module 164) may perform input data classification 518 on the input data 510. In the input data classification 518, the security device 150 (e.g., via the context detection machine learning module 164) may determine to which class the input data 510 belongs. For example, the security device 150 (e.g., via the context detection machine learning module 164) may determine whether the input data 510 belongs to a non-public (e.g., sensitive or private) data class or public data class.

For example, the security device 150 (e.g., via the context detection machine learning module 164) may determine that a first input data 510 (e.g., text written in the name data field) corresponds to or includes non-public information 124. In response, the first input data 510 may be classified in the non-public data class. In another example, the security device 150 (e.g., via the context detection machine learning module 164) may determine that a second input data 510 (e.g., text written in the address data field) corresponds to or includes non-public information 124, the second input data 510 is classified in the non-public data class. In response, the second input data 510 may be classified in the public data class.

In another example, the security device 150 (e.g., via the context detection machine learning module 164) may determine that a third input data 510 (e.g., text written in the address data field) corresponds to or includes non-public information 124. In response, the third input data 510 may be classified in the non-public data class.

In another example, the security device 150 (e.g., via the context detection machine learning module 164) may determine that a fourth input data 510 (e.g., text written in the address data field) corresponds to or includes non-public information 124. In response, the second input data 510 may be classified in the non-public data class.

In certain embodiments, the security device 150 (e.g., via the context detection machine learning module 164) may determine whether input data 510 corresponds to or include non-public information based on detecting a data field that the input data 510 is being added to. For example, if it is determined that the data field is previously tagged to be designated to enter non-public information 124, the input data 510 is determined to be or include non-public information. In response to determining the class of the input data 510, the security device 150 and/or the blockchain network (200 in FIG. 1) may create a classification block 212 and store the classified input data 510 labeled with its class and indication of whether or not it is non-public information in the classification block 212 as a blockchain data entry 216 (see FIG. 2).

Protecting the Non-Public Input Data from Malicious Users

In response to determining the class of the data input 510, the security device 150 may determine whether or not the input data 150 is among the non-public information 124. If it is determined that the input data 150 is not among or not associated with the non-public information 124, the security device 150 may evaluate another input data 510 until no input data 510 is left for evaluation. The security device 150 may perform similar operations in real-time as the input data 510 is being entered into the application 122, periodically (e.g., every second, every five seconds, etc.) or on demand.

If it is determined that the input data 150 is among or associated with the non-public information 124, the security device 150 may mask the input data 510. In certain embodiments, masking the input data 510 may include preventing the input data 510 from being displayed on a screen of a computing device that the application 122 is displayed. Examples of masking the input data 510 may include blurring it, covering it with a filled box, redacting it, and encrypting it by an encryption function so that encrypted data is shown instead, replacing it with a hash value generated by a hash function, among others. The security device 150 may mask the input data 510 as it is being entered into the application 122, in real-time, periodically (e.g., every second, every five seconds, etc.), or on demand.

The security device 150 may tag the masked input data 510 with an authentication instruction 520, such that when the authentication instruction 520 is executed, the authentication instruction 520 prompts a user to provide credentials 524. In certain embodiments, the credentials 524 be credentials used to log into the user profile at the application 122 or other credentials established by the authorized user and/or authorities and provided to the security device 150. Each masked non-public information 124 may be associated with a different credential, and different credentials may be provided to different authorized users based on their respective authority level. When a user wants to access and view the masked input data 510, the user may initiate a request 522 to unmask the masked input data 510, e.g., by clicking on the masked input data 510.

The security device 150 may detect the request 522. In response, the security device 150 may execute the authentication instructions 520. Thus, if a user wants to access and view the masked input data 510, the user can provide the credentials to the user interface. The security device 150 may evaluate the received credentials 524. In this process, the security device 150 may compare the received credentials 524 to the previously-stored credentials 526 associated with the logged-in user profile from which the application is being accessed. The security device 150 may determine whether the received credentials 524 correspond to or match the previously-stored credentials 526.

If the security device 150 determines that the received credentials 524 correspond to or match the previously-stored credentials 526, the security device 150 may determine that the received credentials 524 are valid. In response, the security device 150 may unmask the masked input data 150. In this manner, if an authorized user wants to access and view the masked input data 510, the user can provide the credentials to the user interface. If the user provides invalid/incorrect credentials in response to being prompted to provide credentials, the security device 150 may determine that the received credentials do not match or correspond to the previously-stored credentials. In response, the security device 150 may determine that received credentials are invalid.

In certain embodiments, the security device 150 may count how many invalid credentials are entered. For example, if the security device 150 determines that the user has provided more than a threshold number of invalid credentials in a particular period (e.g., more than five per one minute, ten per six minutes, etc.), the security device 150 may determine that the user is a malicious user 109 who is attempting to gain unauthorized access to the masked input data 510 that is determined to be or include non-public information 124.

Performing Countermeasure Actions

In certain embodiments, the security device 150 may perform one or more countermeasure actions 170 in response to determining that the malicious user 109 is attempting to access the masked input data 510. Examples of the countermeasure actions 170 are described in FIGS. 1-3.

In certain embodiments, the security device 150 may determine the intent of the malicious user 109 and determine the shortest path comprising the least number of action(s) 170 that would lead to countering the intent of the malicious user 109 or the effect of tampering. For example, the security device 150 may perform a similar operation described in FIG. 3 with respect to determining the function of the malicious code and determining the shortest path comprising the least number of action(s) 170 that would lead to countering the function of the malicious code.

In certain embodiments, determining the one or more actions 170 to counter the intent of the malicious user 109 based on the intent of the malicious user 109 may include determining that the one or more actions 170 may comprise blocking network communications originated from the IP address of the malicious user 109 and/or adding the IP address associated with a computing device from which the malicious user 109 is accessing the application 122 to a firewall configuration as a malicious IP address and/or other actions 170 described herein, in response to determining that the malicious user 109 wants to gain unauthorized access to the non-public information 124 associated with the application 122 and/or has other intents 108 described herein.

In certain embodiments, determining the one or more actions 170 to counter the intent of the malicious user 109 based on the intent of the malicious user 109 may include determining that the one or more actions 170 may comprise rerouting the network communications coming from the IP address associated with a computing device from which the malicious user 109 is accessing the application 122 to another application, e.g., an application with more security and monitored by authorities and/or other actions 170 described herein, in response to determining that the malicious user 109 wants to cause performance degradation at the application 122 and/or has other intents 108 described herein.

In certain embodiments, determining the one or more actions 170 to counter the intent of the malicious user 109 based on the intent of the malicious user 109 may include determining that the one or more actions 170 may comprise rerouting the network communications coming from the IP address associated with a computing device from which the malicious user 109 is accessing the application 122 to another application, e.g., an application with more security and monitored by authorities and/or other actions 170 described herein, in response to determining that the malicious user 109 wants to cause network traffic congestion at the application 122 and/or has other intents 108 described herein.

Although in certain embodiments, certain intent or functions 108 of malicious code and/or malicious user, and certain actions 170 are described herein, the mentioned functions 108 and actions 170 are exemplary and are not meant to limit the scope of the present disclosure. The present disclosure also contemplates any function 108 that tampers with an application 122 and any action 170 that can be executed to address and counter the intent or function 108 of the malicious code and/or malicious user attempting to tamper with the application 122.

Example Method for Protecting Non-Public Information from Malicious Users

Figure 6:
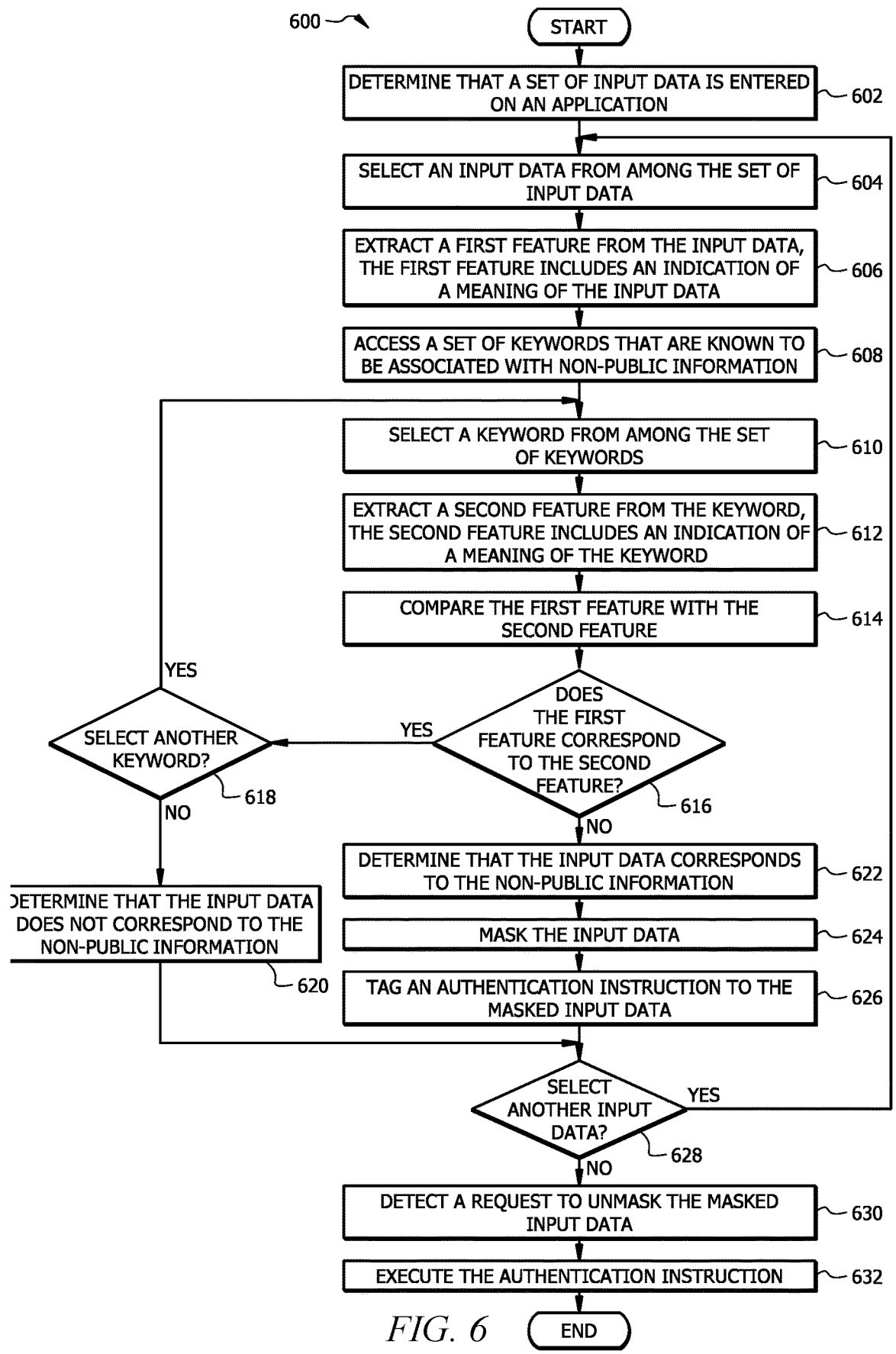
FIG. 6 illustrates an example flowchart of a method for protecting non-public information from malicious users.

FIG. 6 illustrates an example flowchart of a method 600 for protecting non-public information from malicious users. Modifications, additions, or omissions may be made to method 600. Method 600 may include more, fewer, or other operations. For example, operations may be performed in parallel or in any suitable order. While at times discussed as the system 100, security device 150, computing device 120, blockchain network 140, or components of any of thereof performing operations, any suitable system or components of the system may perform one or more operations of the method 600. For example, one or more operations of method 600 may be implemented, at least in part, in the form of software instructions 158 of FIG. 1, stored on non-transitory, tangible, machine-readable media (e.g., memory 156 of FIG. 1) that when run by one or more processors (e.g., processor 152 of FIG. 1) may cause the one or more processors to perform operations 602-632.

At operation 602, the security device 150 determines that a set of input data 510 is entered on an application 122. For example, the security device 150 may monitor the events on the application 122 in real-time, periodically (e.g., every second, every five seconds, etc.), or on demand.

At operation 604, the security device 150 selects an input data 510 from among the set of input data 510. The security device 150 may iteratively select an input data 510 until no input data 510 is left for evaluation.

At operation 606, the security device 150 extracts a first feature 512a from the input data 510, the first feature 512a may include an indication of a meaning of the input data 510. For example, the security device 150 may feed the input data 510 to the context detection machine learning module 166 to extract the features 512a, similar to that described in FIG. 5.

At operation 608, the security device 150 accesses a set of keywords 516 that are known to be non-public information 124.

At operation 610, the security device 150 selects a keyword 516 from among the set of keywords 516. The security device 150 may iteratively select a keyword 516 until no keyword 516 is left for evaluation.

At operation 612, the security device 150 extracts a second feature 512b from the keyword 516, the second feature 512b may include an indication of the meaning of the keyword 516.

At operation 614, the security device 150 compares the first feature 512a with the second feature 512b.

At operation 616, the security device 150 determines whether the first feature 512a corresponds to the second feature 512b. If it is determined that the first feature 512a corresponds to the second feature 512b, the method 600 proceeds to operation 618. Otherwise, the method 600 proceeds to operation 622.

At operation 618, the security device 150 determines whether to select another keyword 516. The security device 150 determines to select another keyword 516 if at least one keyword 516 is left for evaluation. If the security device 150 determines to select another keyword 516, the method 600 returns to operation 610. Otherwise, the method 600 proceeds to operation 620.

At operation 620, the security device 150 determines that the input data 510 does not correspond to the non-public information 124. At operation 622, the security device 150 determines that the input data 510 corresponds to the non-public information 124.

At operation 624, the security device 150 masks the input data 510. For example, the security device 150 may blur the input data 510. Other examples of masking the input data 510 are provided in the discussion of FIG. 5.

At operation 626, the security device 150 tags an authentication instruction 520 to the masked input data 510. For example, the security device 150 may tag a data field or data object that is associated with the masked input data 510 and/or identifies the masked input data 510 with the authentication instruction 520.

At operation 628, the security device 150 determines whether to select another input data 510. The security device 150 may determine to select another input data 510 if at least one input data 510 is left for evaluation. If the security device 150 determines to select another input data 510, the method 600 returns to operation 604. Otherwise, the method 600 proceeds to operation 630.

At operation 630, the security device 150 detects a request 522 to unmask the masked input data 510. For example, when the user wants to view and access the input data 510, the user may initiate the request 522 on the application 122.

At operation 632, the security device 150 executes the authentication instruction 520. The security device 150 may unmask the masked input data 510 if it is determined that the credentials provided by the user are valid, similar to that described in FIG. 5. The security device 150 may not unmask the masked input data 510 if it is determined that the credentials provided by the user are invalid and may block the user profile from which the application is being accessed until the issue is resolved by authorities, similar to that described in FIG. 5.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:
1. A system for detecting and countering malicious code executed on a web application comprising:

a memory configured to store a set of historical configuration parameter values associated with a web application, wherein the set of historical configuration parameter values provides information about historical events that occurred on the web application;

a processor operably coupled to the memory, and configured to:

detect a set of configuration parameter values associated with the web application, the set of configuration parameter values provides information about events occurring on the web application;

for at least a first configuration parameter value from among the set of configuration parameter values:

determine the first configuration parameter value over a particular period;

compare the first configuration parameter value with a counterpart configuration parameter value from among the set of historical configuration parameter values;

determine a difference between the first configuration parameter value and the counterpart configuration parameter value;

determine that the difference between the first configuration parameter value and the counterpart configuration parameter value exceeds a threshold rate;

in response to determining that the difference between the first configuration parameter value and the counterpart configuration parameter value exceeds the threshold rate:

determine that a malicious code is executed on the web application;

determine a function associated with the malicious code, wherein the function associated with the malicious code is one or more of gaining unauthorized access to non-public information associated with the web application, causing performance degradation at the web application, or causing network traffic congestion at the web application;

determine, based at least in part upon the function associated with the malicious code, one or more actions to counter the malicious code; and execute at least one of the one or more actions.

2. The system of claim 1, wherein the one or more actions comprise:

blocking network communications originated from an Internet Protocol (IP) address associated with the malicious code;

rerouting the network communications originated from the IP address associated with the malicious code; or adding the IP address associated with the malicious code to a firewall configuration as a malicious IP address.

3. The system of claim 1, wherein the processor is further configured to:

display the one or more actions on a screen;

receive user input indicating that the at least one of the one or more actions is confirmed; and use the user input as feedback for further events where the malicious code is detected to have been executed on web applications, such that when the malicious code is detected to have been executed on a second web application, the at least one of the one or more actions is executed.

4. The system of claim 1, wherein the processor is further configured to:

detect a user interaction session at the web application, wherein the user interaction session involves a user attempting to access a user profile on the web application; and in response to determining that the malicious code is executed on the web application, terminate the user interaction session.

5. The system of claim 1, wherein the set of configuration parameter values comprises at least one of:

a number of visits to the web application;

a location from which the web application is visited;

a number of times a database associated with the web application is accessed;

a number of failed login attempts at the web application;

a number of failures to load one or more web pages associated with the web application;

a number of Application Programming Interface (API) calls made to the web application; or a number of API responses made by the web application.

6. The system of claim 1, wherein determining that the malicious code is executed on the web application is in response to determining that more than a threshold number of set of configuration parameter values are deviating from counterpart historical configuration parameter values by more than the threshold rate.

7. The system of claim 1, wherein, determining, based at least in part upon the function associated with the malicious code, the one or more actions to counter the malicious code comprises:

in response to determining that the malicious code is executed to gain unauthorized access to the non-public information associated with the web application, the at least one of the one or more actions comprises blocking network communications originated from an Internet Protocol (IP) address associated with the malicious code or adding the IP address associated with the malicious code to a firewall configuration as a malicious IP address;

in response to determining that the malicious code is executed to cause performance degradation at the web application, the at least one of the one or more actions comprises rerouting the network communications coming from the IP address associated with the malicious code to another application; or in response to determining that the malicious code is executed to cause network traffic congestion at the web application, the at least one of the one or more actions comprises rerouting the network communications coming from the IP address associated with the malicious code to another application.

8. A method for detecting and countering malicious code executed on a web application comprising:

detecting a set of configuration parameter values associated with the web application, the set of configuration parameter values provides information about events occurring on the web application;

for at least a first configuration parameter value from among the set of configuration parameter values:

determining the first configuration parameter value over a particular period;

comparing the first configuration parameter value with a counterpart configuration parameter value from among a set of historical configuration parameter values associated with the web application, wherein the set of historical configuration parameter values provides information about historical events that occurred on the web application;

determining a difference between the first configuration parameter value and the counterpart configuration parameter value;

determining that the difference between the first configuration parameter value and the counterpart configuration parameter value exceeds a threshold rate;

in response to determining that the difference between the first configuration parameter value and the counterpart configuration parameter value exceeds the threshold rate:

determining that a malicious code is executed on the web application;

determining a function associated with the malicious code, wherein the function associated with the malicious code is one or more of gaining unauthorized access to non-public information associated with the web application, causing performance degradation at the web application, or causing network traffic congestion at the web application;

determining, based at least in part upon the function associated with the malicious code, one or more actions to counter the malicious code; and executing at least one of the one or more actions.

9. The method of claim 8, wherein the one or more actions comprise:

blocking network communications originated from an Internet Protocol (IP) address associated with the malicious code;

rerouting the network communications originated from the IP address associated with the malicious code; or adding the IP address associated with the malicious code to a firewall configuration as a malicious IP address.

10. The method of claim 8, further comprising:

displaying the one or more actions on a screen;

receiving user input indicating that the at least one of the one or more actions is confirmed; and using the user input as feedback for further events where the malicious code is detected to have been executed on web applications, such that when the malicious code is detected to have been executed on a second web application, the at least one of the one or more actions is executed.

11. The method of claim 8, further comprising:

detecting a user interaction session at the web application, wherein the user interaction session involves a user attempting to access a user profile on the web application; and in response to determining that the malicious code is executed on the web application, terminating the user interaction session.

12. The method of claim 8, wherein the set of configuration parameter values comprises at least one of:

a number of visits to the web application;
a location from which the web application is visited;
a number of times a database associated with the web application is accessed;
a number of failed login attempts at the web application;
a number of failures to load one or more web pages associated with the web application;
a number of Application Programming Interface (API) calls made to the web application; or
a number of API responses made by the web application.

13. The method of claim 8, wherein determining that the malicious code is executed on the web application is in response to determining that more than a threshold number of set of configuration parameter values are deviating from counterpart historical configuration parameter values more than the threshold rate.

14. The method of claim 8, wherein, determining, based at least in part upon the function associated with the malicious code, the one or more actions to counter the malicious code comprises:

in response to determining that the malicious code is executed to gain unauthorized access to the non-public information associated with the web application, the at least one of the one or more actions comprises blocking network communications originated from an Internet Protocol (IP) address associated with the malicious code or adding the IP address associated with the malicious code to a firewall configuration as a malicious IP address;

in response to determining that the malicious code is executed to cause performance degradation at the web application, the at least one of the one or more actions comprises rerouting the network communications coming from the IP address associated with the malicious code to another application; or in response to determining that the malicious code is executed to cause network traffic congestion at the web application, the at least one of the one or more actions comprises rerouting the network communications coming from the IP address associated with the malicious code to another application.

15. A non-transitory computer-readable medium that stores instructions that when executed by a processor cause the processor to:

detect a set of configuration parameter values associated with the web application, the set of configuration parameter values provides information about events occurring on the web application;

for at least a first configuration parameter value from among the set of configuration parameter values:

determine the first configuration parameter value over a particular period;

compare the first configuration parameter value with a counterpart configuration parameter value from among a set of historical configuration parameter values associated with the web application, wherein the set of historical configuration parameter values provides information about historical events that occurred on the web application;

determine a difference between the first configuration parameter value and the counterpart configuration parameter value;

determine that the difference between the first configuration parameter value and the counterpart configuration parameter value exceeds a threshold rate;

in response to determining that the difference between the first configuration parameter value and the counterpart configuration parameter value exceeds the threshold rate:

determine that a malicious code is executed on the web application;

determine a function associated with the malicious code, wherein the function associated with the malicious code is one or more of gaining unauthorized access to non-public information associated with the web application, causing performance degradation at the web application, or causing network traffic congestion at the web application;

determine, based at least in part upon the function associated with the malicious code, one or more actions to counter the malicious code; and execute at least one of the one or more actions.

16. The non-transitory computer-readable medium of claim 15, wherein the one or more actions comprise:

blocking network communications originated from an Internet Protocol (IP) address associated with the malicious code;

rerouting the network communications originated from the IP address associated with the malicious code; or adding the IP address associated with the malicious code to a firewall configuration as a malicious IP address.

17. The non-transitory computer-readable medium of claim 15, wherein the instructions when executed by the processor, further cause the processor to:

display the one or more actions on a screen;

receive user input indicating that the at least one of the one or more actions is confirmed; and use the user input as feedback for further events where the malicious code is detected to have been executed on web applications, such that when the malicious code is detected to have been executed on a second web application, the at least one of the one or more actions is executed.

18. The non-transitory computer-readable medium of claim 15, wherein the instructions when executed by the processor, further cause the processor to:

detect a user interaction session at the web application, wherein the user interaction session involves a user attempting to access a user profile on the web application; and in response to determining that the malicious code is executed on the web application, terminate the user interaction session.

19. The non-transitory computer-readable medium of claim 15, wherein the set of configuration parameter values comprises at least one of:

a number of visits to the web application;

a location from which the web application is visited;

a number of times a database associated with the web application is accessed;

a number of failed login attempts at the web application;

a number of failures to load one or more web pages associated with the web application;

a number of Application Programming Interface (API) calls made to the web application; or a number of API responses made by the web application.

20. The non-transitory computer-readable medium of claim 15, wherein determining the function associated with the malicious code comprises determining which set of application configuration parameter values deviated from counterpart historical application configuration parameter values, such that:

in response to determining that a number of failed login attempts exceeds the threshold rate, determining that the function associated with the malicious code comprises gaining unauthorized access to non-public information associated with the web application;

in response to determining that each of a number of access to a database associated with the web application and a number of failures to load one or more web pages associated with the web application exceeds the threshold rate, determining that the function associated with the malicious code comprises causing performance degradation at the web application; and in response to determining that each of a number of Application Programming Interface (API) requests made by the web application and a number of API responses made by the web application exceeds the threshold rate, determining that the function associated with the malicious code comprises causing network traffic congestion at the web application.

* * * * *